Sheet 1, 2 Sheets.

T. Varney

Ore Amalgamator.

No. 1,924. Reissued Mar. 28, 1865.

Witnesses:
J. Smith
A. B. Jones

Inventor:
Thomas Varney
by his Atty. Wm. H. Lane

Sheet 2, 2 Sheets.

T. Varney.

Ore Amalgamator.

No. 1,924. Reissued Mar. 28, 1865.

Witnesses:
T. Smith
L. C. Jones

Inventor:
Thomas Varney
by Atty. Thos. T. Everett

UNITED STATES PATENT OFFICE.

THOMAS VARNEY, OF SAN FRANCISCO, CALIFORNIA.

IMPROVED AMALGAMATOR.

Specification forming part of Letters Patent No. 37,185, dated December 16, 1862; Reissue No. 1,924, dated March 28, 1865.

*To all whom it may concern:*

Be it known that I, THOMAS VARNEY, of the city and county of San Francisco, and State of California, have invented a new and useful Improvement in Amalgamators for Gold and Silver—that is to say, in what are commonly called and known as "amalgamating" pans;" and I do hereby declare that the following is a full, clear, and exact description of the construction and operation of the same, reference being had to the annexed drawings, making a part of this specification, in which—

Figure 1:
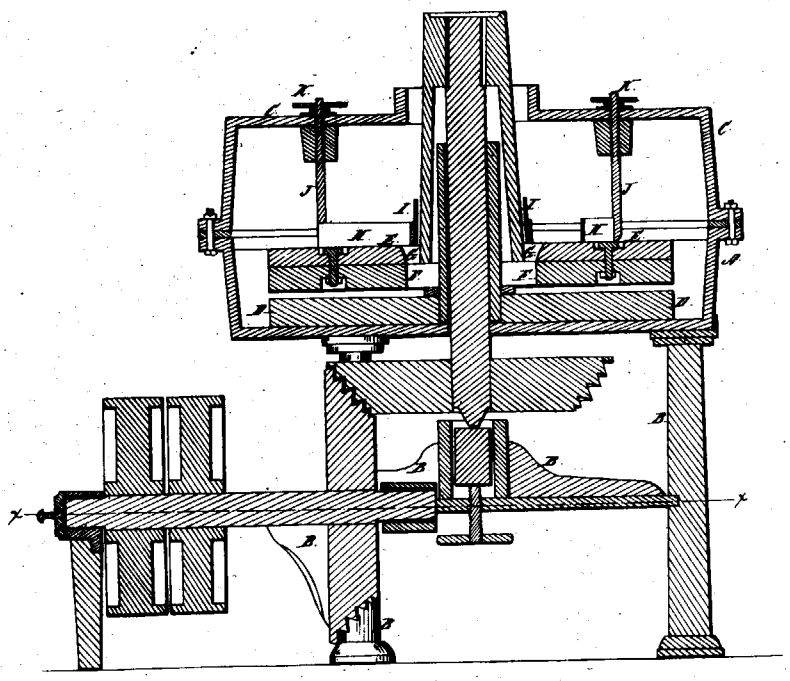
Figure 3:
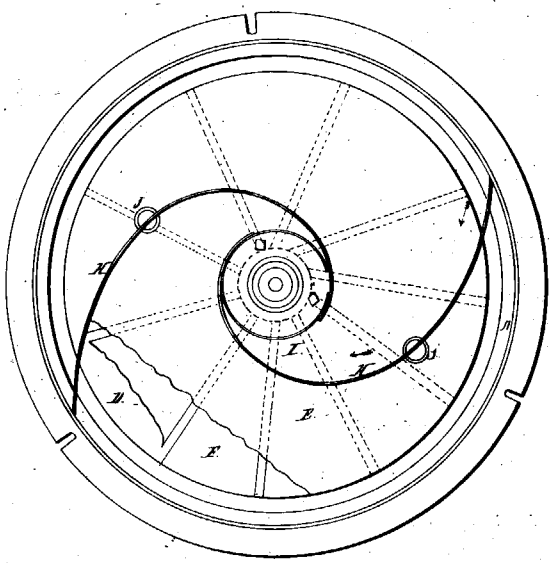
Figure 2:
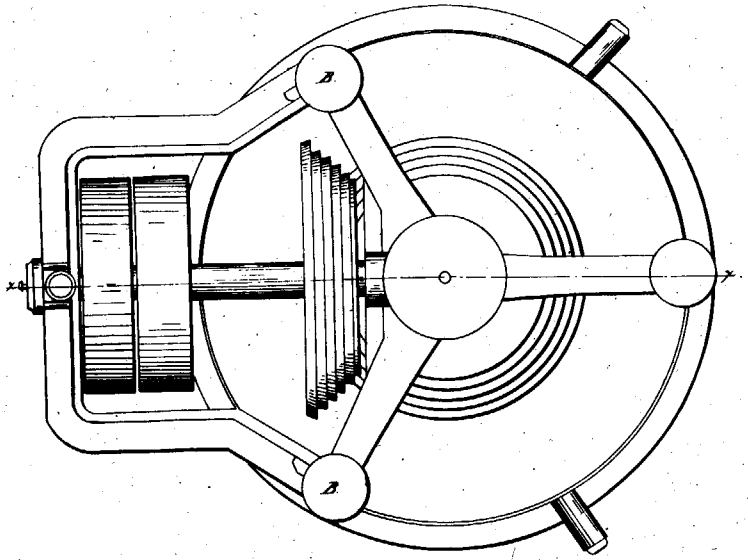

Figure 1 is a vertical central section of a pan with my improvement, *x x*, Fig. 2, indicating the line of section. Fig. 2 is a horizontal section of the same, taken in the line *x x*, Fig. 1. Fig. 3 is a top view of the interior of the pan with a portion of the upper muller and its shoes broken away.

Similar letters of reference indicate corresponding parts in the different figures.

The nature of my invention consists in providing and suspending within the body of the amalgamating-pan and in the pulp to be ground and amalgamated, stationary curved plates in such number and of such size and form as to counteract the outward tendency of the pulp above the upper muller caused by the rotation of the same, and to turn the rotary current inward and guide it to or toward the center of the pan, and at the same time to secure a thorough mixture of the pulp.

To enable those skilled in the art to make and use my invention, I will proceed to describe its construction and operation with reference to the drawings, and, in order to do this the more clearly, I will also describe a pan in which the said invention may be used.

The body of the amalgamator consists of a pan or tub, A, supported by proper framework, B, with a cover, C, through which there is a opening for the introduction of the pulp to be amalgamated, which consists of crushed ore and water. The cover may be placed upon the pan loosely or made to fit and fasten to it water-tight. The latter method will allow the pan to be filled more nearly full of pulp, the cover preventing any spattering or overflow of the pulp, and also facilitating the return of the same to or toward the center. The pan may be used without a cover, in which case the same should not be filled as full as otherwise. Within and on the bottom of the pan and secured to it lies the lower or stationary muller, D, being a circular plate. This muller may be made whole or in sections. It may also be furrowed, slotted, or grooved in any manner desired. Above the lower muller is the upper or rotating one, E, of like general form, with a diameter somewhat less that of the interior of the pan. To the lower face of the upper muller are attached shoes F, of any desired number and form, with proper spaces between them, through which to allow an abundant flow of pulp from the center to the circumference, when the lower face of the shoes are in contact with the upper face of the lower muller. At or near and around the center of the upper muller are openings G through it, of sufficient number and size to allow an abundant flow of pulp through them downward and outward between the mullers and grinding-surfaces. Other openings of any desired number, form, and position may be made through the upper muller.

The bottom of the pan and the mullers, instead of being flat, as shown in the drawings, may be of any other desired form.

The upper muller is adjustable vertically, and made to rotate horizontally by means of the machinery and gearing shown in Figs. 1 and 2, or by any other proper means.

Within the body of the pan are suspended curved plates H, extending in length (horizontally) from the inner surface of the pan around in the direction of the muller's motion to points near the center of the pan and about one-third of the circle in advance of those from which they start, respectively, if three plates be used, and about one-half of the circle if two plates be used.

In case the mullers and bottom of the pan are made to incline downward from the circumference toward the center, or if the speed of the upper muller is slow, or the central openings in the upper muller are large, or if there are openings in it nearer the circumference, as well as for various other reasons, the curved plates may extend to a less distance from the innner surface of the pan toward the center. In width (vertically) these plates extend from near the upper surface of the upper muller upward two-thirds of the distance to the top of the pan, more or less.

The width of the plates may be less in proportion to their circumference in number.

When the plates extend to near the center of the pan, all their inner ends are attached rigidly to the ring I, and are suspended by a rod, J, fastened to each plate and running up through the cover (or in the absence of a cover through a cross-bar) and hand-wheel K, by which the same may be adjusted vertically.

The plates may extend upward quite to the cover and be permanently fastened thereto, or, when short, may be suspended to the sides of the pan.

The operation is as follows: The pan being properly charged with pulp and quicksilver, and the proper speed being given to the upper muller, the pulp between the mullers, by reason of the centrifugal force, is made to pass outward through the channels between the mullers, and also between the grinding-surfaces, against, into, and over the quicksilver, and thence upward into the body of the pan, thereby causing the ore to be pulverized and amalgamation to take place. The rotation of the upper muller causes the body of the pulp in the pan to revolve with it, and this motion causes the pulp to seek the circumference of the pan and tend to assume a concave form; but this circular current and outward tendency of the pulp are met by the curved plates and turned inward toward the center, allowing the pulp to go downward through the openings through the upper muller and outward again between the mullers, and also causing the surface of the pulp to remain nearly level and the same to be thoroughly mixed.

Having thus described my invention, what I claim as new, and desire to secure by Letters Patent, is—

The curved plates, constructed substantially in the manner and used as and for the purposes set forth.

San Francisco, January 19, 1865.

THOMAS VARNEY.

Witnesses:
ALFRED RIX,
J. CLARKE.